United States Patent [19]

Oliver

[11] Patent Number: 6,029,190
[45] Date of Patent: Feb. 22, 2000

[54] READ LOCK AND WRITE LOCK MANAGEMENT SYSTEM BASED UPON MUTEX AND SEMAPHORE AVAILABILITY

[75] Inventor: Richard J. Oliver, Laguna Beach, Calif.

[73] Assignees: Sony Corporation, Tokyo; Sony Electronics, Inc., Park Ridge, N.J.

[21] Appl. No.: 08/937,094

[22] Filed: Sep. 24, 1997

[51] Int. Cl.[7] ........................................ G06F 9/00
[52] U.S. Cl. .......................................... 709/107
[58] Field of Search ................................ 709/101, 104, 709/107, 400, 102

[56] References Cited

U.S. PATENT DOCUMENTS

| | | | |
|---|---|---|---|
| 5,410,697 | 4/1995 | Baird et al. | 711/152 |
| 5,644,768 | 7/1997 | Periwal et al. | 395/672 |

OTHER PUBLICATIONS

Daniel Glasser, "*Efficient Synchronization Techniques for Multithreaded Win32–based Applications*", Microsoft Systems Journal, 1995 #2 (Feb.), pp. 1–37.

*Primary Examiner*—Majid A. Banankhah
*Attorney, Agent, or Firm*—Blakely, Sokoloff, Taylor & Zafman LLP

[57] ABSTRACT

A method and apparatus for implementing a read/write lock mechanism in software. In an operating environment that allows objects such threads to wait on a plurality of synchronization objects simultaneously, a read/write lock can be implemented using two synchronization objects such as a mutex and a semaphore. Further, a variable is introduced to track the number of reader threads awaiting to read protected data. The read/write lock permits a plurality of reader threads to access protected data simultaneously, while only allowing a single writer thread access to a protected data location.

22 Claims, 5 Drawing Sheets

READ LOCK AND WRITE LOCK MANAGEMENT SYSTEM BASED UPON MUTEX AND SEMAPHORE AVAILABILITY

BACKGROUND OF THE INVENTION

1. Field of the Invention

The present invention relates generally to the field of computer software. More specifically, the invention relates multi-threaded, multi-tasking synchronization techniques in computer software.

2. Description of the Related Art

One of the challenges in building a multi-threaded application or a multi-tasking application is controlling access to per-process protected data, particularly file handles or dynamically-allocated data structures. When reading from and writing to such objects or data locations, the underlying operating system should provide a safe means of maintaining the validity and coherency of the data. A coherency/validity problem may exist when a read is performed prematurely before a critical write or when a write is likewise performed before a read which required the previous data state. One such mechanism for preventing data coherency problems is known as a read/write lock.

Win32 (i.e., 32-bit Windows™ operating systems) based software is provided the advantage of having synchronization objects available to threads and processes running in a Win32 environment (such as Windows NT™) (Windows, Windows NT are trademarks of Microsoft Corporation). One such synchronization object is known as a mutex or mutual exclusion object. In a multi-threaded environment, the prior art typically specifies that a single mutex be used to service all threads and/or processes requiring access to the same protected data location(s). Only a single thread or process may own the mutex at any one time with other threads/processes put into a wait state. The use of exclusive access mutexes only partially overcomes a deficiency in certain operating systems, which is the lack of true read/write locking mechanisms for data. Such exclusive access with a single mutex prevents multiple "readers" (threads or processes requesting a read from a data location) from accessing the same data (location) simultaneously and thus, exclusive access mutexes introduce a latency interfering with a multi-threading advantage, that of quick concurrent thread processing. A further problem known as priority inversion, which is described in FIG. 3(a) below, also exists with single mutex only systems.

Having a mutex and no other synchronization object for each shared resource (data location/object) is not always a viable solution since the problem of deadlock where one thread claims the mutex of object A and waits for the mutex of object B, while a second thread claims the mutex of object B and waits for the mutex of object A is quite possible. Further, the chance of deadlock increases with every shared resource, and consequently every new mutex added.

Without read/write locks in the operating system, and given the deadlock contention issue, most applications are constrained to having a single mutex in order to guarantee data coherency for both read and write requests. When other synchronization objects are provided by the operating system, a common solution has been to use a mutex to protect the other synchronization objects and data used to implement a read/write lock patch, as described in *"Efficient Synchronization Techniques for Multithreaded Win32-Based Applications,"* Daniel Glasser, Microsoft Systems Journal, February 1995. However, this approach suffers in that it defeats another operating system feature that allows a thread to wait for multiple thread synchronization objects simultaneously. Thus, what is needed is an efficient read/write software lock mechanism that can be executed within any multi-threaded, multi-tasking operating system. Such a mechanism should be portable and of low-latency particularly when the application utilizing it has real-time constraints.

SUMMARY OF THE INVENTION

A method and apparatus for implementing a read/write lock mechanism in software. In an operating environment that allows objects such threads to wait on a plurality of synchronization objects simultaneously, a read/write lock can be implemented using two synchronization objects such as a mutex and semaphore. Further, a variable is introduced to track the number of reader threads awaiting to read protected data. The read/write lock permits a plurality of reader threads to wait simultaneously, while only allows a single writer thread access to a protected data location.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
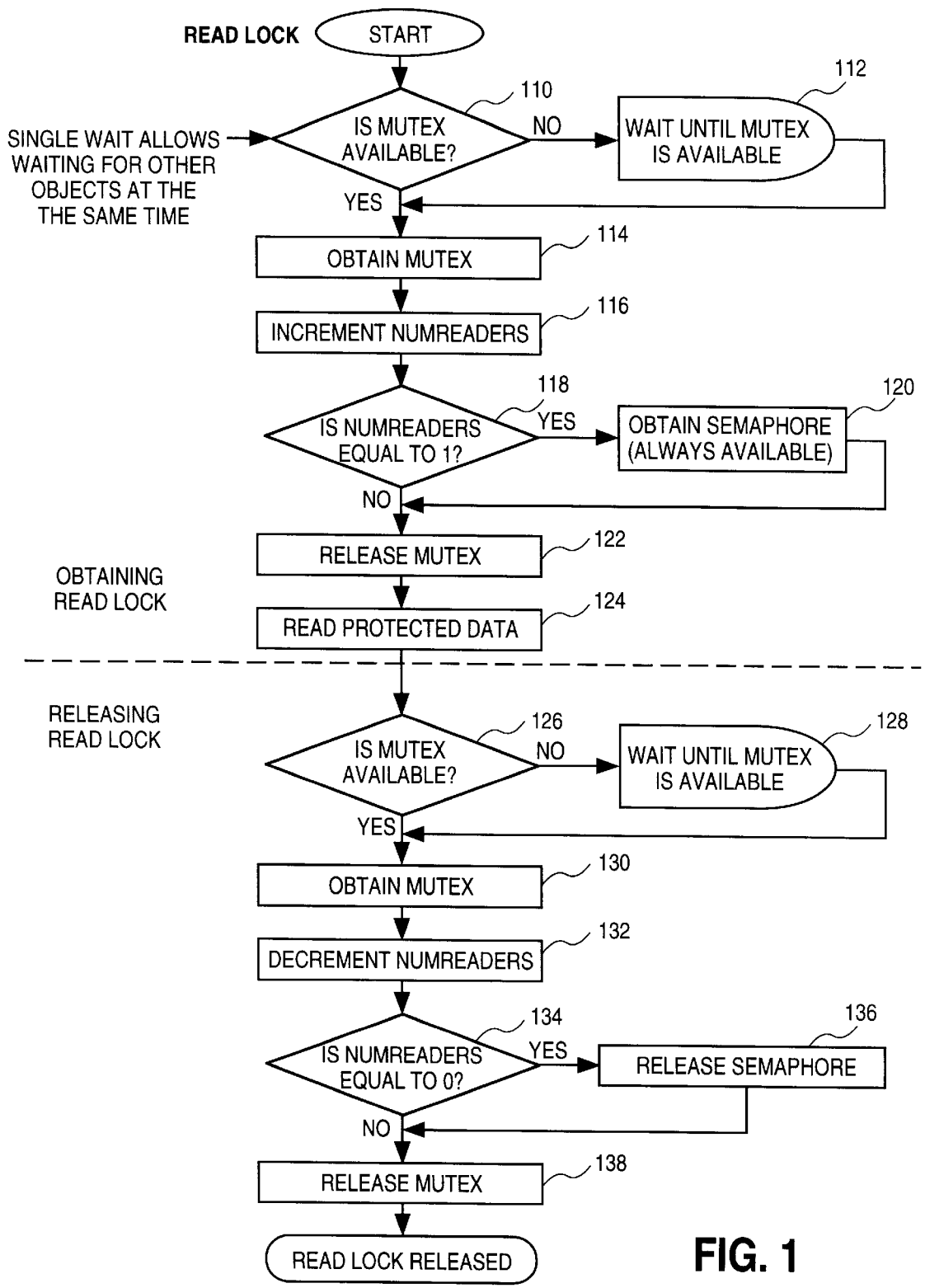
FIG. 1 is a flow diagram of a read lock mechanism according to one embodiment of the invention.

FIG. 1 is a flow diagram of a read lock according to one embodiment of the invention.

As described above, the traditional model of a single mutex handling read/write access for multiple threads is deficient. Thus, the present invention introduces a read/write lock mechanism by making use additionally of a second synchronization object known as a semaphore as well as a tracking variable. The combined use of semaphore, mutex and tracking variable allows efficient, stable multi-thread data access in a more simultaneous fashion than the prior art.

Figure 2:
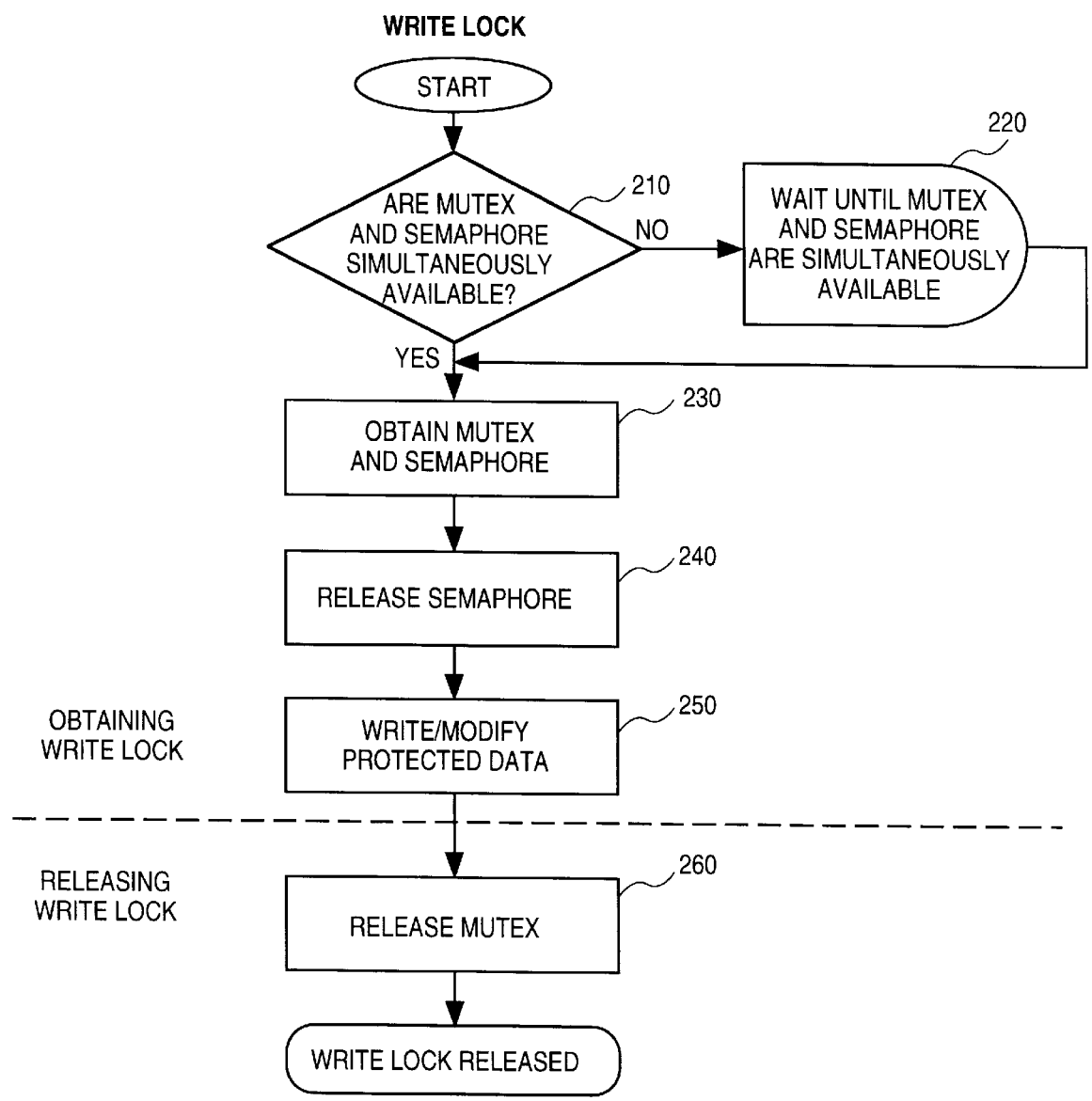
FIG. 2 is a flow diagram of a write lock mechanism according to one embodiment of the invention.

FIG. 1 describes the read lock portion of the mechanism, while FIG. 2 describes the write lock portion of the mechanism. When the two portions are considered together, data access is assured to be reliable. The first step in obtaining a read lock is to check for the availability of the mutex (for a given thread) (step 110). The mutex is only available when all priority protected writes on that location have been performed (see FIG. 2). If the mutex is not available, then a wait state is employed (step 112) until the mutex does become available. When the mutex is available, it is obtained by the reader thread (step 114).

The goal is to give multiple reader threads (objects requesting a read) access to data providing a preclusive write is not required for the data to be valid. To track the access of multiple readers to a data location, a variable "numReaders", which has an initial value of 0, is incremented (step 116). The first condition regarding the use of the semaphore is to check if numReaders is equal to 1 (step 118). If numReaders is not equal to one then the semaphore is obtained by the thread (step 120). Unlike the mutex, the read/write lock mechanism insures that the semaphore is always made available at this step. If numReaders is equal to 1, then only one reader remains, and the mutex is released (step 122).

When the mutex is released, the protected data is read out (step 124). Multiple reader threads may consecutively obtain the mutex (step 114) and read out data, until a write supersedes and claims the mutex (see FIG. 2). After protected data is read out, the read lock may be released independently by each reader. The reader thread may be interrupted by other threads before completing its read operation entirely, especially as shown in FIG. 3(*b*) where a lower priority thread completes its read in two stages. In order to release the read lock, the availability of the mutex is again checked (step 126). If the mutex is not available, a wait state is again employed (step 128) until the mutex becomes available. When the mutex becomes available, the reader thread obtains the mutex (step 130). Then, the nuoReaders variable is decremented (step 132). The decrementing of the numreaders variable signals that the protected data has been read out for the reader thread executing the release. The final test condition is whether numReaders is equal to zero (step 134). If numreaders=0, this signals that no more readers own the read lock, and the semaphore is released (step 136). In either case, the mutex is released (step 138) and if needed, a new read lock or write lock can be established. The release of the semaphore implies that all read threads at a given instant have been complete, at which point the write lock may claim the mutex. By allowing more than one thread to read the protected data, concurrent, quick access to the protected data areas is achieved.

FIG. 2 is a flow diagram of a write lock mechanism according to one embodiment of the invention.

The read lock mechanism and write lock mechanism work in tandem since the same mutex and semaphore are being used. The data validity problem is most commonly the occurrence of read out-of-schedule during a write from the same data location. As with the prior art, the single mutex and a variable tracking multiple reads are utilized for all threads, but the further addition of a semaphore conditional release mechanism allows multi-threaded reading.

The performance of a write is very critical since an out-of-order write can invalidate or cause faulting data to be provided to a large number of reader threads. In the case where the data is being used in a recursive fashion, the fault is propagated. Thus, the performance of the system is dictated largely by control of the write to data locations by ensuring multiple readers await an in-order write to data. When there are multiple writer threads, these writer threads are not permitted to own the write lock simultaneously.

The first step in the write lock mechanism is to check for the simultaneous availability of the mutex and the semaphore (step 210). As with the read lock mechanism, the synchronization objects are wait stated, if not available, but unlike the read lock mechanism, the semaphore is also obtained simultaneously. If either or both are unavailable, then a wait state is maintained until the mutex and semaphore are simultaneously available (step 220). The semaphore is only "always available" at step 120, as a result of the operation of the whole mechanism. The mutex and semaphore, when available, are both obtained by the thread. Since the semaphore is obtained at this step only to guarantee that the read lock is not active, it may be immediately thereafter released for later availability to other threads. Next, the protected data is written to or modified (step 250). After the protected data is written to or modified, the mutex is released (step 260), and if needed, a new read lock or write lock can be established.

Both the read lock mechanism and write lock mechanism should be considered as an integrated whole, and the following example is explanatory of such integration. Assume that the following sequence of threads need access to same data location and attempt access in this order:

| Thread | Operation | Priority |
|--------|-----------|----------|
| A      | Reader    | 1        |
| B      | Reader    | 2        |
| C      | Reader    | 5        |
| D      | Writer    | 4        |
| E      | Reader    | 3        |

Assume further that no other operations, read or write were pending at the time thread A makes its request and that it has the highest priority. Thus, the mutex is available for thread A. However, thread B, thread C and thread E must wait for the mutex until available (step 112 of FIG. 1). Also, writer thread D must wait for the mutex until it is available at the same time as the semaphore. This waiting of a thread for multiple synchronization objects is a feature of some operating systems (but not others) most notably Windows NT™ which allows threads to wait simultaneously on a plurality of synchronization objects.

The numReaders variable, initiated at a value of "0" is incremented to "1" (step 116). Since numReaders is equal to 1, the semaphore is obtained. At this stage, thread A releases the mutex and reads out the protected data (steps 122–124 of FIG. 1). With the mutex released, other reader threads may obtain the read lock. But, since the semaphore is not available simultaneously with the mutex, the writer thread may not obtain the write lock. According to step 126 of FIG. 1, the availability of the mutex is checked. At this point, thread A waits at step 128, thread D is waiting at step 220, and the other (reader) threads are waiting at step 112. The wait condition for any one thread, except thread D, could be satisfied, and since thread C has the highest priority, it obtains the mutex. Thus, numReaders is now incremented to 2, the mutex is released, and thread C reads the protected data. (numreaders would be greater than 2 if more lower priority threads were waiting at step 128 prior to the activation of higher priority threads.) Thread C again obtains the mutex (since it has highest priority) in step 126, decrements numReaders to 1, and releases the mutex. Thread D has the next highest priority, but it cannot obtain the semaphore, and so cannot obtain the mutex, either. Therefore, thread E obtains the mutex, increments numReaders to 2, releases the mutex, reads the protected data, obtains the mutex, decrements numReaders, and releases the mutex. Then thread B goes through the same steps as thread E. Then thread B goes through the same steps as thread E. Then thread A, which has been waiting at step 128, obtains the mutex, decrements numReaders to 0, which causes it to release the semaphore, then releases the mutex.

Finally, there are no more readers (signaled by the releasing of the semaphore), so thread C is able to obtain both the mutex and the semaphore in step 230, then release the semaphore, modify the protected data, and release the mutex.

Figure 3A:
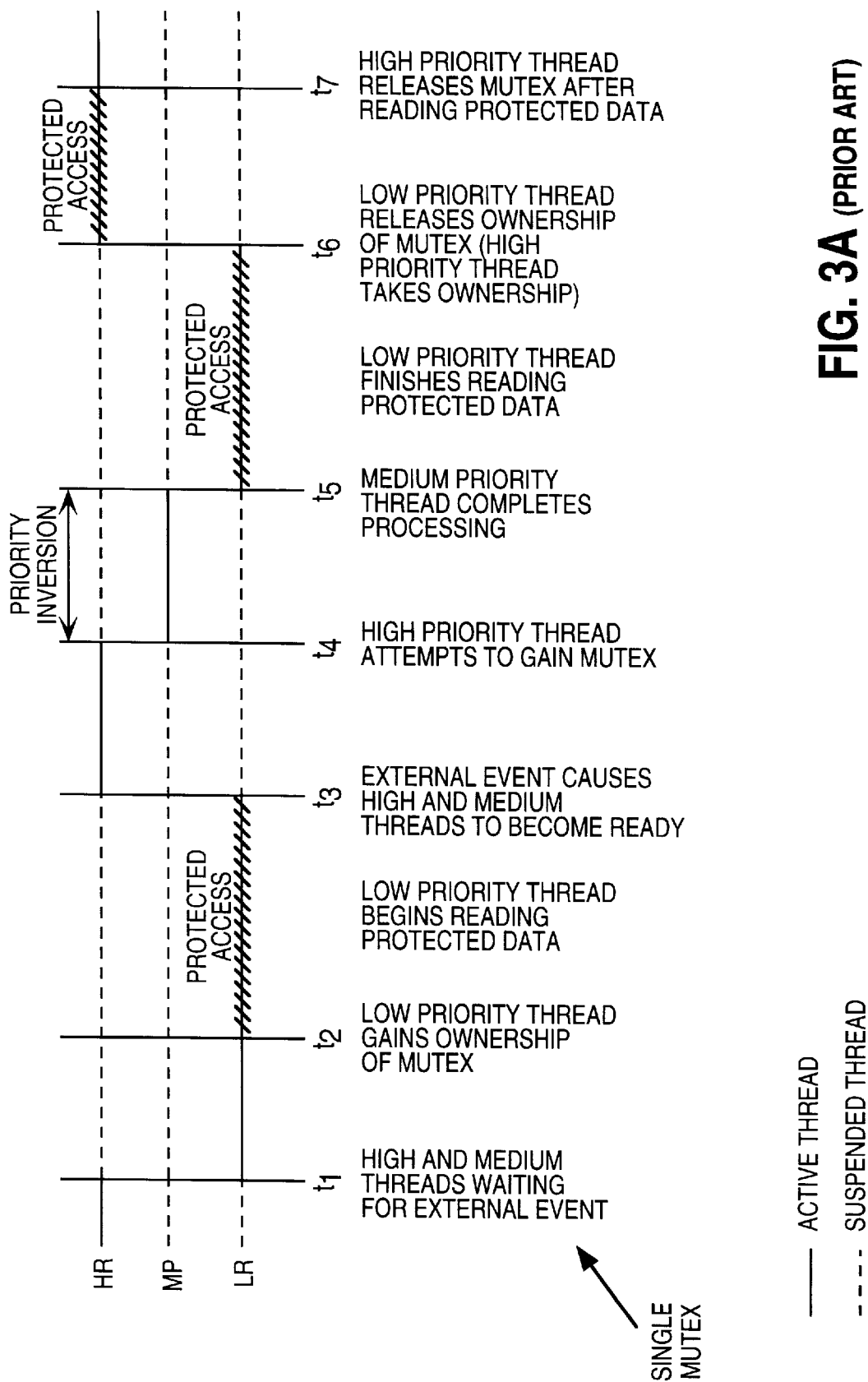
FIGS. 3(a)–3(b) illustrate the issue of priority inversion comparing the prior art with one embodiment of the invention.
Figure 3B:
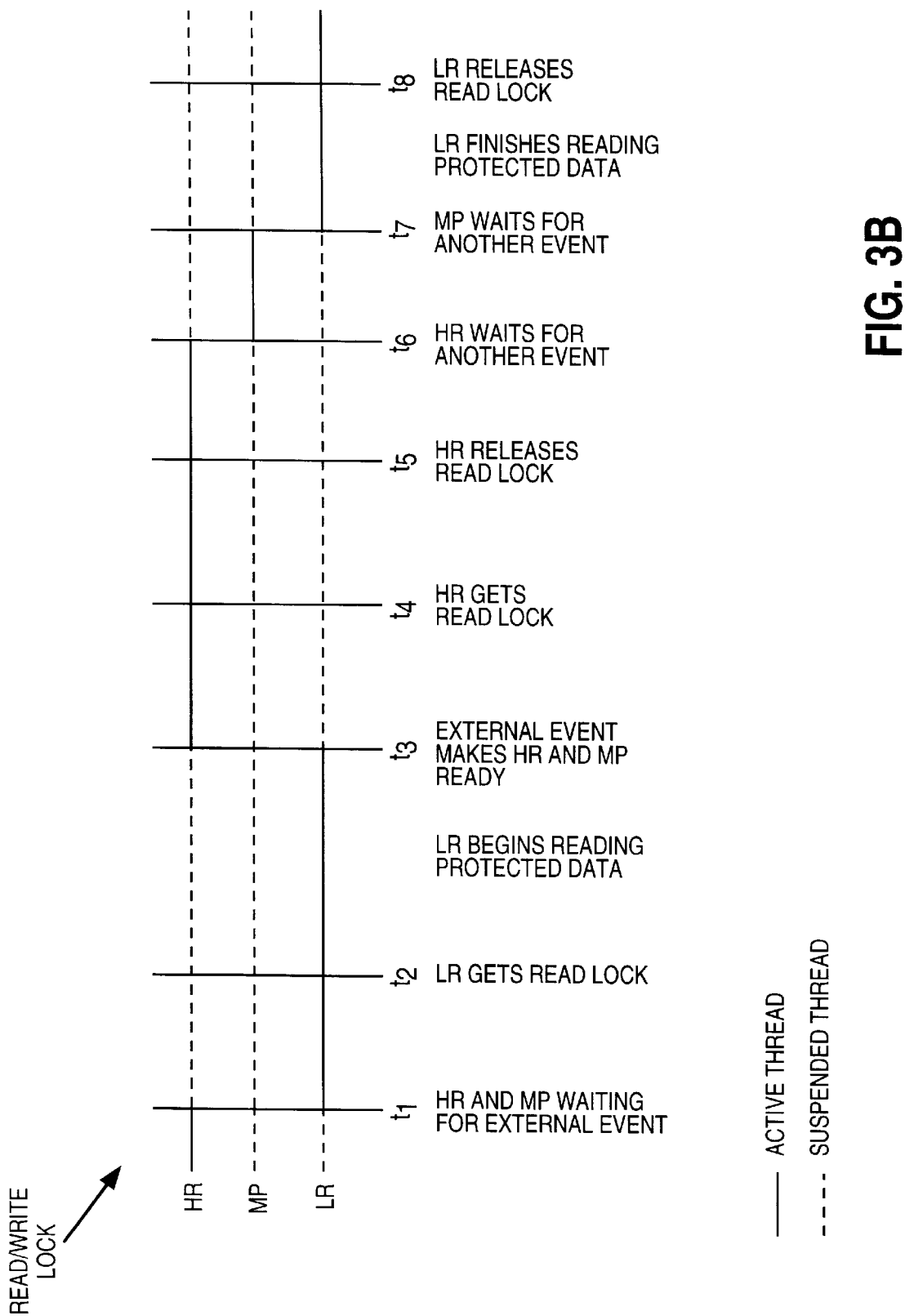

FIGS. 3(a)–3(b) illustrate the issue of priority inversion comparing the prior art with one embodiment of the invention.

FIG. 3(a) illustrates the problem of priority inversion, where a lower priority thread prevents processing of a higher priority thread. FIG. 3(a) shows the traditional prior art technique of using just a single mutex rather than a read/write lock mechanism as shown in various embodiments of the invention. The three lines, each partially broken (dashed) and partially solid represent from top to bottom, a high priority reader thread (HR), medium priority processing thread (MP), and low priority reader thread (LR), respectively. An active thread is indicated by a solid line, while a thread in a suspended or wait state is indicated by a dashed or broken line.

At time $t_1$ and until time $t_3$, the HR and MP are both awaiting an external event before becoming active. The low priority LR gains ownership of the mutex at time $t_2$ while HR and MP are still awaiting the external event. Between time $t_2$ and $t_3$, the LR begins reading the protected data. At time $t_3$, the external event occurs causing HR and MP to become active.

HR has a higher priority than thread MP such that MP is temporarily suspended between $t_3$ and $t_4$. Even though both HR and MP are active, the ownership of the mutex by LR will prevent HR from reading out the data. Thus, at time $t_4$, the high priority thread HR attempts to gain access to the mutex, but cannot. Meanwhile, between times $t_4$ and $t_5$, the MP, which is a medium priority processing thread not requiring access to the protected data, completes processing. The existence of only a single mutex and no other read/write mechanism in the prior art creates the situation at $t_5$ to $t_6$ where the low priority thread finishes reading the protected data at $t_6$ before HR is able to even begin reading. At time $t_6$, the mutex is released by the low priority thread LR, and the high priority thread HR gains its ownership. HR reads the protected data and at time $t_7$, releases the mutex.

The external event from time $t_3$ to $t_4$ and the processing of the medium priority thread from time $t_4$ to $t_5$ prevented the low priority thread from completing processing. As a result, both high and low priority readers were simultaneously ready, but the lower priority thread gained the advantage by having previously owned the mutex, since at $t_1$, LR was the only active thread. Thus, a "priority inversion" resulted where the low priority thread LR won a contention between HR. The ownership of the mutex by the LR at time $t_2$ was without regard to the higher priority thread HR, since HR was suspended and had not yet attempted to gain the mutex. As illustrated in FIG. 3(b), the priority inversion problem is eliminated by the read/write lock mechanism of the various embodiments of the invention.

Consistent with at least one embodiment of the invention, both mutex and semaphore as well as the numReaders variable are available to implement the read/write lock mechanism. At time $t_1$, again, both HR and MP are waiting for an external event before becoming active. At time $t_2$, the availability of the lock again allows LR to gain ownership of the lock and to begin reading the protected data. At time $t_3$, the occurrence of the external event causes HR and MP to become ready for activity. Since the read lock can be obtained by multiple threads at the same time, at time $t_4$, HR is able to obtain the read lock without waiting. After reading the protected data from $t_4$ to ts, HR releases the read lock at $t_5$. At time $t_6$, HR waits for its next activating event. The MP, the next priority thread, is given permission by the operating system to become active and complete its processing from $t_6$ to $t_7$. At $t_7$, while MP is waiting for its next activating event, LR finishes reading out the protected data and at $t_8$, releases the read lock. The ability of HR to obtain and release a read lock while LR also has a read lock but is suspended due to higher priority processing prevents the problem of priority inversion among reader threads. The critical point is at $t_4$ when in the prior art of FIG. 3(a), the mutex could not be reacquired by HR. In the present invention, the ability of HR to reacquire the lock allows LR to finish its processing later and ensures that the operating system will process threads with regard to priority (i.e., the high priority thread now executes first, as it should).

The ability of more than one thread to wait on the read lock allows threads to be processed in an efficient manner and also preserves operating system priority. The mutex/semaphore read/write lock of the present invention uses this mechanism.

Figure 4:
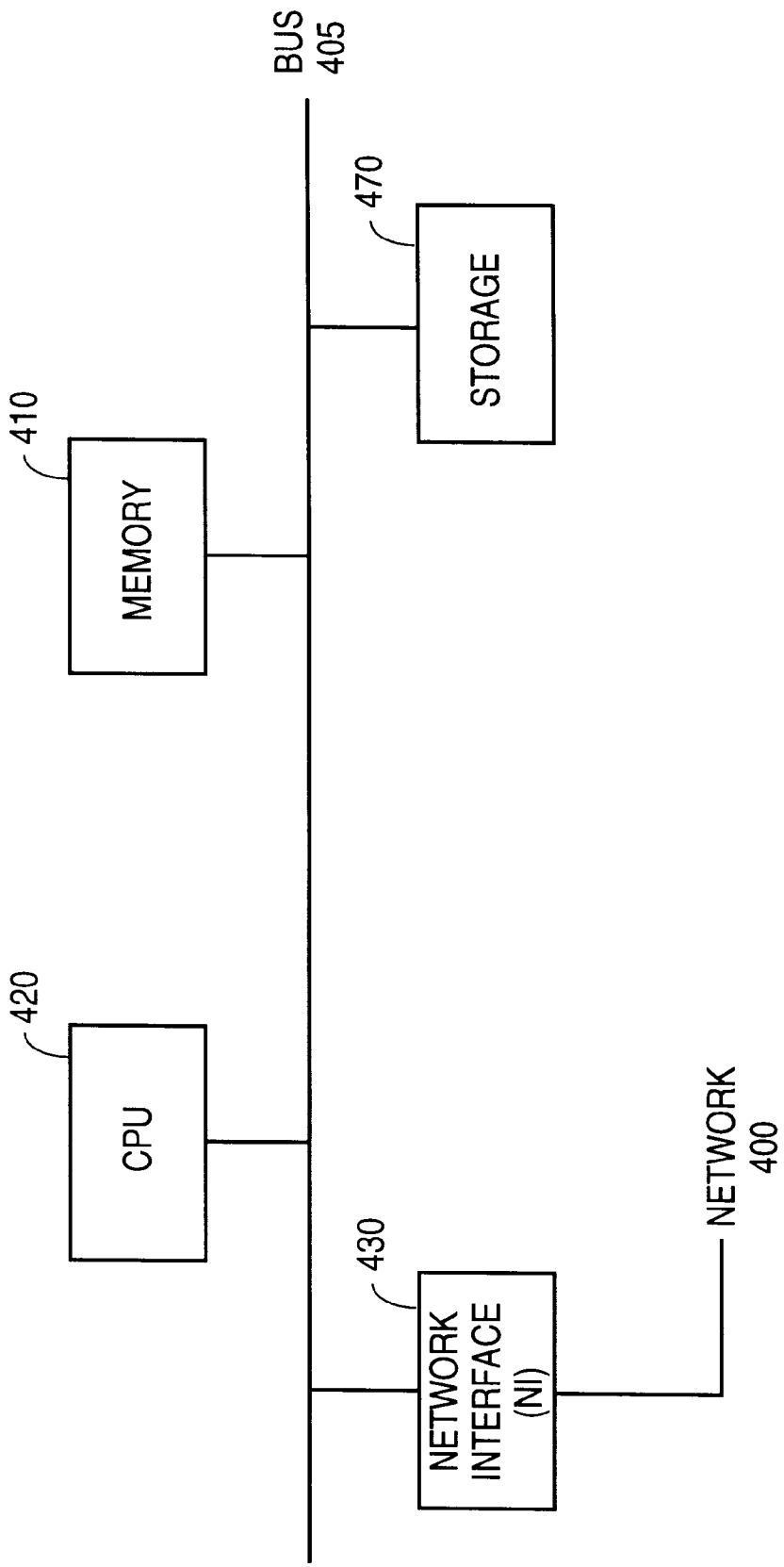
FIG. 4 illustrates a computer system capable of implementing the various embodiments of the invention.

FIG. 4 illustrates a computer system capable of implementing the various embodiments of the invention.

The computer system of FIG. 4 includes a CPU (Central Processing Unit) 420, memory 410, storage unit 470 and a network interface (NI) 430.

A bus 405, such as PCI (Peripheral Component Interconnect), couples together CPU 420, memory 410, storage unit 470 and NI 430 such that they may transact data and control information among one another. The C++ class libraries mentioned in the Appendix A includes code that can be compiled as a set of instructions stored in memory 410 and executed by CPU 420. This code can be modularly introduced into the operating system controls or into any individual software application. These instructions can be stored as C++ code or as an executable on storage unit 470, and may be loaded into memory 410 for execution by CPU 420 when needed. The reader and writer threads and/or other objects can be viewed as sets of run time executing instructions generated by CPU 420 interpreting code stored in memory 410. The read/write lock mechanism can work with regard to data locations whether temporary, as stored in memory 410, and/or more permanent, as stored in storage unit 470. These protected data areas may be read out by multiple reader threads but only written by any one writer thread. As mentioned earlier, the read/write lock mechanism can be employed as an add-on or enhancement to the operating system, or as an add-on module for a particular application.

Reader and writer threads may originate from a network 400 with whom communication is made possible by NI 430. According to one embodiment of the invention, the reader and writer threads which are exposed on network 400 can be prioritized by a single application on one computer system which acts as a control/scheduling unit. The methodology described in various other embodiments may be extended to the distributed environment, which includes a plurality of computer systems such as that shown in FIG. 4 along with other devices. Further, the read/write lock mechanism can be utilized equally well in a multi-processor computer system wherein each processor may originate threads which may require access to the same protected data.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method for simulating a read/write lock comprising:
    obtaining a read lock for a plurality of reader threads given a first condition occurs, the first condition comprising the availability of a mutex, said mutex comprising a single object that can be waited upon simultaneously by said plurality of reader threads and a plurality of writer threads; and
    obtaining a write lock for a single writer thread given that a second condition occurs, the second condition comprising the simultaneous availability of a mutex and a semaphore, said semaphore comprising a single object that can be waited upon simultaneously by a plurality of writer threads.

2. A method according to claim 1, wherein obtaining a read lock comprises:
    obtaining said mutex when available;
    incrementing a first variable to track the number of reader threads active;
    testing a third condition, said third condition comprising said first variable being equal to one;
    releasing said mutex; and
    reading data from a location protected by said read lock.

3. A method according to claim 2 wherein if said third condition is true, said semaphore is obtained, and if said third condition is false, said semaphore is not obtained.

4. A method according to claim 1, further comprising:
    releasing the obtained read lock by one of said plurality of reader threads; and
    releasing the obtained write lock by said single writer thread.

5. A method according to claims 1, wherein obtaining a write lock comprises:
    obtaining said mutex and said semaphore when said mutex and said semaphore are both available;
    releasing said semaphore; and
    writing to a data location protected by said write lock.

6. A method according to claim 4, wherein releasing the read lock comprises:
    obtaining said mutex when available;
    decrementing said first variable;
    testing a fourth condition, said fourth condition comprising said first variable being equal to zero; and
    releasing said mutex.

7. A method according to claim 6 wherein if said fourth condition is true, said semaphore is released.

8. A method according to claim 4, wherein releasing a write lock comprises releasing said mutex.

9. A computer system comprising:
    a processor;
    a memory coupled to said processor, said processor configured to:
        obtain a read lock for a plurality of reader threads given a first condition occurs, the first condition comprising the availability of a mutex, said mutex comprising a single object that can be waited upon simultaneously by said plurality of reader threads and a plurality of writer threads; and
        obtain a write lock for a single writer thread given that a second condition occurs, the second condition comprising the simultaneous availability of a mutex and a semaphore, said semaphore comprising a single object that can be waited upon simultaneously by a plurality of writer threads.

10. A computer readable medium comprising instructions, which when executed by a processor, perform the steps for simulating read/write lock comprising:
    obtaining a read lock for a plurality of reader threads given a first condition occurs, the first condition comprising the availability of a mutex, said mutex comprising a single object that can be waited upon simultaneously by said plurality of reader threads and a plurality of writer threads; and
    obtaining a write lock for a single writer thread given that a second condition occurs, the second condition comprising the simultaneous availability of a mutex and a semaphore, said semaphore comprising a single object that can be waited upon simultaneously by a plurality of writer threads.

11. The computer readable medium according to claim 10, further comprising instructions, which when executed obtain a read lock by:
    obtaining said mutex when available;
    incrementing a first variable to track the number of reader threads active;
    testing a third condition, said third condition comprising said first variable being equal to one;
    releasing said mutex; and
    reading data from a location protected by said read lock.

12. The computer readable medium according to claim 11, wherein if said third condition is true, said semaphore is obtained, and if said third condition is false, said semaphore is not obtained.

13. The computer readable medium according to claim 10, further comprising instructions which when executed, release the obtained read lock by one of said plurality of reader threads, and release the obtained write lock by said single writer thread.

14. A computer readable medium according to claims 10, wherein obtaining a write lock comprises obtaining said mutex and said semaphore when said mutex and said semaphore are both available; releasing said semaphore; and writing to a data location protected by said write lock.

15. A computer readable medium according to claim 13, wherein releasing the read lock comprises obtaining said mutex when available; decrementing said first variable; testing a fourth condition, said fourth condition comprising said first variable being equal to zero; and releasing said mutex.

16. A computer readable medium according to claim 12, wherein releasing a write lock comprises releasing said mutex.

17. The computer readable medium according to claim 15, wherein if said fourth condition is true, said semaphore is released.

18. The computer system according to claim 9, wherein the processor is configured to obtain a read lock by obtaining said mutex when available; incrementing a first variable to track the number of reader threads active; testing a third condition, said third condition comprising said first variable being equal to one; releasing said mutex; and reading data from a location protected by said read lock.

19. The computer system according to claim 9, wherein the processor is further configured to release the obtained read lock by one of said plurality of reader threads; and release the obtained write lock by said single writer thread.

20. The computer system according to claims 9, wherein the processor is configured to obtain a write lock by obtaining said mutex and said semaphore when said mutex and said semaphore are both available; releasing said semaphore; and writing to a data location protected by said write lock.

21. A computer system comprising:

a processor configured to execute a plurality of threads;

a memory coupled to the processor;

a mutex comprising a single object that can be waited upon concurrently by a plurality of reader thread and a plurality of writer threads;

a semaphore comprising a single object that can be waited upon concurrently by a plurality of writer threads;

a read lock for a plurality of reader threads, said read lock obtained by a thread if a given first condition comprising the availability of a mutex occurs; and a write lock for a single writer thread if a second condition comprising the concurrent availability of the mutex and the semaphore occurs.

22. The computer system according to claim 21, further comprising a first variable to track the number of reader threads active.

* * * * *

UNITED STATES PATENT AND TRADEMARK OFFICE
CERTIFICATE OF CORRECTION

PATENT NO. : 6,029,190
DATED : February 22, 2000
INVENTOR(S) : Richard J. Oliver It is certified that error appears in the above-identified patent and that said Letters Patent is hereby corrected as shown below:

In column 3 at lines 30-31 delete "nuoReaders" and insert --numReaders--

In column 4 at line 56 delete "numreaders" and insert --numReaders--

In column 6 at line 5 delete "ts" and insert --$t_5$--

Signed and Sealed this

Twenty-seventh Day of March, 2001

Attest:

NICHOLAS P. GODICI

Attesting Officer

Acting Director of the United States Patent and Trademark Office